Aug. 12, 1924.
H. A. G. FORNELIUS
PISTON RING TOOL
Filed Jan. 19, 1923
1,505,017
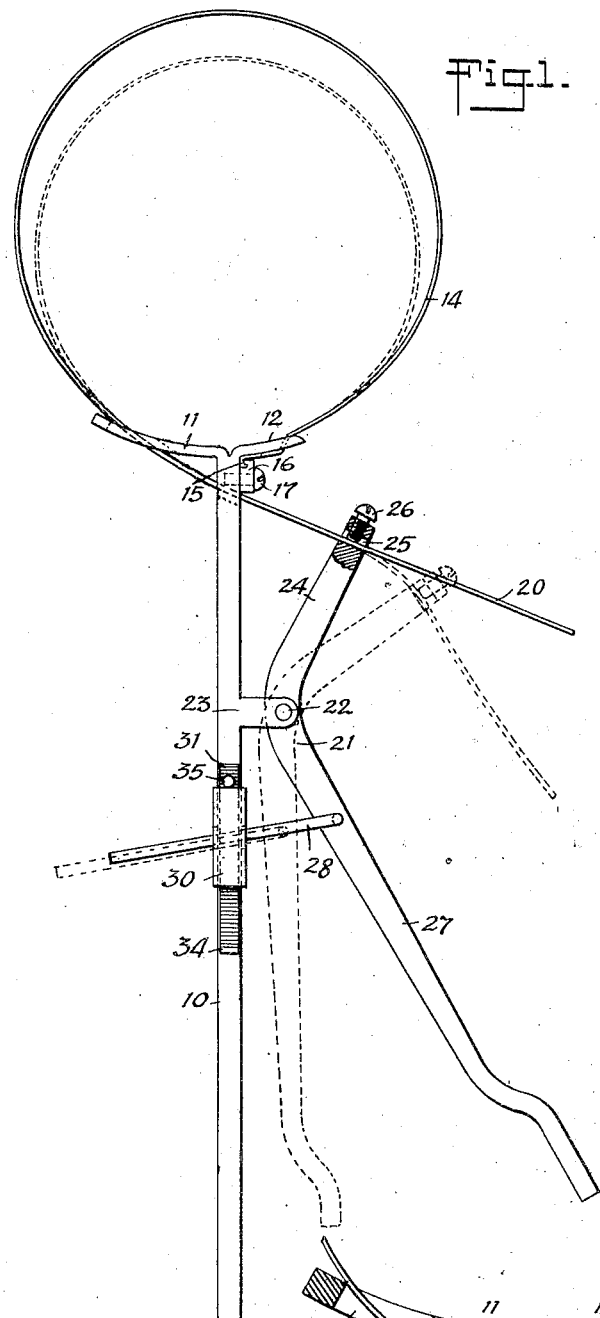
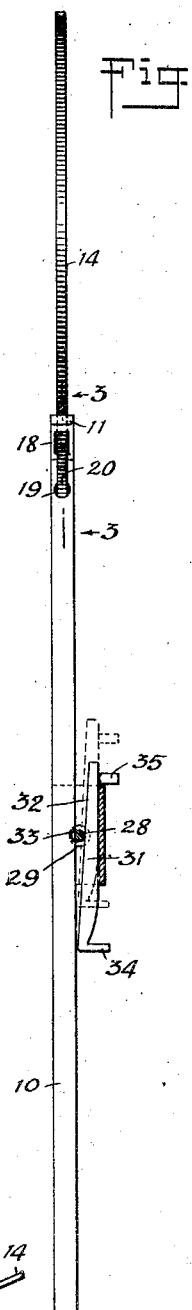
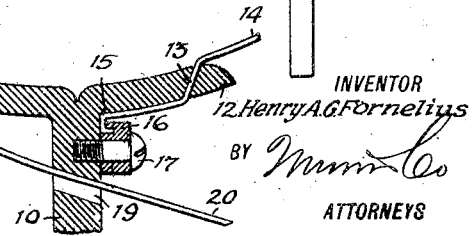
WITNESSES
INVENTOR
Henry A. G. Fornelius
BY
ATTORNEYS Patented Aug. 12, 1924.

1,505,017

UNITED STATES PATENT OFFICE.

HENRY A. G. FORNELIUS, OF CLIFTON, NEW JERSEY.

PISTON-RING TOOL.

Application filed January 19, 1923. Serial No. 613,757.

*To all whom it may concern:*

Be it known that I, HENRY A. G. FORNELIUS, a subject of the King of Sweden, and a resident of Clifton, in the county of Passaic and State of New Jersey, have invented a new and Improved Piston-Ring Tool, of which the following is a full, clear, and exact description.

This invention has relation to tools and particularly refers to a tool for contracting a piston ring to facilitate its application to a piston.

The principal object of the present invention is to provide a tool of the character set forth which is capable of a wide range of adjustment to accommodate piston rings of various diameters.

A further object of the invention is to provide in a piston ring contracting tool which includes a flexible resilient ring embracing member, means for holding said member in approximately ring form at all times whereby the fitting of the member over the ring is greatly facilitated.

As a still further object the invention contemplates a piston ring contracting tool which includes means for retaining the tool in its variously adjusted positions whereby the necessity of employing both hands is obviated.

The invention furthermore contemplates a tool of the character described which is extremely simple in its construction and mode of use and highly efficient in its purpose.

With the above recited and other objects in view the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawing—

Figure 1 is a side view of a tool constructed in accordance with the invention illustrating in full and dotted lines the expanded and contracted positions thereof.

Fig. 2 is an edge view.

Fig. 3 is an enlarged fragmentary detail sectional view taken approximately on the line 3—3 of Fig. 2.

Referring to the drawing by characters of reference, 10 designates a handle or shank which is formed at one extremity with oppositely projecting concentric arcuate arms 11 and 12 the former being of slightly greater relative length than the latter. The arm 12 is formed with a slot or opening 13 through which one end of a flexible resilient strip 14 protrudes, the terminal 15 of which is securely clamped against the shank or handle 10 at its juncture with the arm 12 by a block 16 through which a screw 17 passes and is anchored in the shank. The remainder of the strip 14 is disposed in a substantially circular form or loop concentric with the arms 11 and 12 and with the opposite end projecting through the slot 18 in the arm 11 and a slot 19 in the shank or handle 10. The strip 14 being of a flexible resilient material normally tends to expand to withdraw the free extremity 20 thereof from the apertures 18 and 19. The means for preventing the withdrawal of the same and for effecting the contraction thereof consists of a bell crank lever 21 which is fulcrumed as at 22 to a bearing lug 23 projecting from the opposite side of the handle or shank 10 from that from which the arm 11 extends. The short arm 24 of the bell crank is apertured as at 25 and is adapted to have threaded therethrough the free extremity 20 of the strip 14, the same being locked against relative movement with respect to the arm 24 by a set screw 26 which constitutes a means for permitting of the initial setting of the strip to obtain a loop of a predetermined minimum diameter. The long arm 27 of the bell crank constitutes a manipulating handle for rocking the same and serves upon movement toward the shank or handle 10 to effect a contraction of the strip 14 from its normal maximum diameter to smaller diameters. In order to provide means for preventing the inherent resiliency of the strip 14 from swinging the lever, a rod 28 is pivoted to the long arm 27 and extends through the apertures 29 in a U-shaped housing 30 in which a slidable wedge bar 31 is mounted. The inclined face 32 of the wedge bar operates upon movement in one direction to force the rod 28 into a notch 33 formed in the handle or shank 10 and to frictionally lock the same against longitudinal movement. An upturned manipulating extremity 34 is formed at one edge of the wedge bar and a pin 35 at the opposite end to prevent entire displacement of the wedge bar.

In use and operation of the device, the mechanic initially adjusts the loop in the strip 14 by engaging the set screw 26 with the free extremity 20 thereof. This permits the use of the device in connection with piston rings of various sizes which fall between the maximum and minimum diameters which the manipulation of the device allows for. If larger or smaller rings are to be operated upon, other adjustments in the size of the loop are obtained by loosening and re-engaging the set screw 26. After the additional adjustment is made, the loop is expanded by moving the arm 27 of the bell crank away from the handle 10 to engage the loop over the ring and then moving the arm 27 toward the handle 10 until the loop tightly embraces the ring. The ring may be held by pressing the wedge bar 31 to frictionally lock the lever against movement to allow for the expansion of the loop. The construction, namely the arcuate arms 11 and 12 effect the retention of the strip 14 in substantially ring or looped form at all times.

I claim:

1. A piston ring tool comprising a shank, a flexible resilient strip secured at one end to one end of the shank, a plurality of spaced guide means formed at the said end of the shank through which the free end of the strip is trained and by which said strip is engaged at circumferentially spaced points whereby to maintain the same in ring form, and means pivoted to the shank having connection with the free extremity of the strip for effecting circumferential contraction and expansion of the strip upon manipulation of the said pivoted means.

2. A piston ring tool comprising a shank having a pair of oppositely projecting concentric arcuate arms, a resilient flexible strip secured at one end to one of the arms, a guide opening formed in the opposite arm, a guide opening formed in the shank adjacent said arm, the free end of said strip being passed through said guide openings to maintain the strip in ring form, and means pivoted to the shank having connection with the free extremity of the strip for effecting circumferential contraction and expansion of the ring upon manipulation of said pivoted means.

3. A piston ring tool comprising a shank having a pair of oppositely projecting concentric arcuate arms, a resilient flexible strip secured at one end to one of the arms, a guide opening formed in the opposite arm, a guide opening formed in the shank adjacent said arm, the free end of said strip being passed through said guide openings to maintain the strip in ring form, and means pivoted to the shank having connection with the free extremity of the strip for effecting circumferential contraction and expansion of the ring upon manipulation of said pivoted means, said connection being adjustable whereby the maximum and minimum diameters of the ring may be initially regulated.

HENRY A. G. FORNELIUS.